April 10, 1945.   N. D. OWEN   2,373,142
OIL DILUTION SYSTEM
Filed June 19, 1944

INVENTOR.
NASSER D. OWEN
BY
ATTORNEYS

Patented Apr. 10, 1945

2,373,142

UNITED STATES PATENT OFFICE 2,373,142

OIL DILUTION SYSTEM

Nasser D. Owen, Albuquerque, N. Mex.

Application June 19, 1944, Serial No. 541,079

4 Claims. (Cl. 123—187.5)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to oil dilution systems for internal combustion engines and more particularly to systems wherein engine fuel is used to dilute cold and congealed oil in pressure gauge lines.

Difficulty has been experienced in oil lines leading to pressure gauges, which are exposed to cold weather, due to thickening and increased viscosity of the oil in the lines thus rendering the gauge inaccurate or inoperative. It is an object of my invention to provide a system for forcing engine fuel into the oil pressure gauge line for the purpose of decreasing the viscosity of the oil therein. It is a further object of my invention to utilize an engine priming pump for the dual purpose of priming the engine and diluting the oil in the oil pressure gauge line. In accordance with the invention, a simple system is provided comprising a minimum of parts and line connections in which a two-way valve is incorporated controllable from the instrument panel board for the purpose of shunting fuel flow from the outlet of a priming pump to either the engine cylinders or the pressure gauge oil line or other oil line subject to conditions of use which will make oil dilution therein desirable. A detailed description of my invention follows hereinafter which will be more fully understood by reference to the appended drawing, in which:

Figure 1:
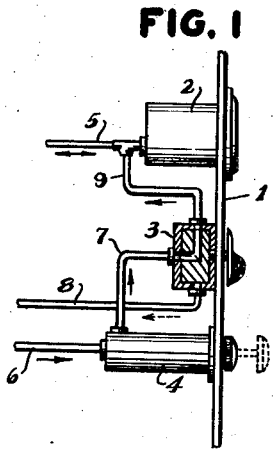
Fig. 1 represents an oil dilution system for use in conjunction with a single engine.
Figure 3:
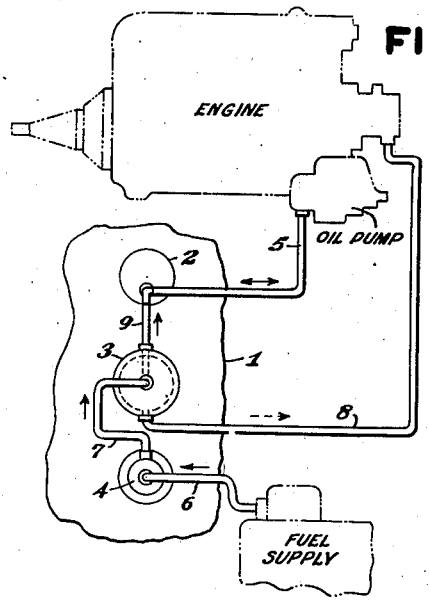
Fig. 3 is a view of the system shown in Fig. 1 and oriented 90° therefrom.
Figure 5:
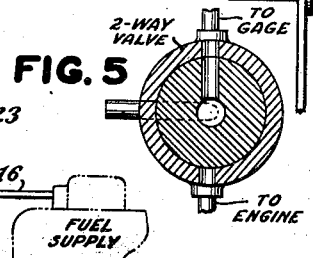
Fig. 5 is a transverse sectional view of one of the two-way rotary valves used in the system disclosed in Figs. 1 and 2, the specific connections thereto being shown for the two-way valve of the system shown in Fig. 1.

Referring to Figs. 1, 3 and 5, an instrument panel 1 is shown having mounted thereon an oil pressure gauge 2, a conventional two-way rotary valve 3 and an engine priming pump 4. Oil line 5 provides communication between the gauge 2 and the engine oil system (not shown) and a pump inlet line 6 is connected from the fuel supply source (not shown) to the priming pump 4. A valve inlet line 7 is connected from pump 4 to the two-way valve 3. A valve outlet line 8 provides communication from one of the ports of valve 3 to the engine cylinders (not shown) and another valve outlet line 9 is connected between the valve 3 and oil line 5 at a point at the rear of gauge 2.

In operation, valve 3 may be rotated to connect either line 7 with line 9 whereby fuel can be drawn from the fuel source and forced by means of pump 4 into line 5 for diluting the relatively static oil therein or valve 3 may be rotated to connect line 7 with line 8 for priming the engine cylinders in a well known manner. It has been found in practice in at least one installation, that approximately half a dozen reciprocations of the plunger of pump 4 is sufficient to dilute the oil line 5 to render the gauge operative. The amount of pumping required is not critical and will, of course, depend on the capacity of the pump and the diameter and length of the pressure gauge oil line, as well as on the degree of viscosity of the cold oil in the oil line 5.

Figure 2:
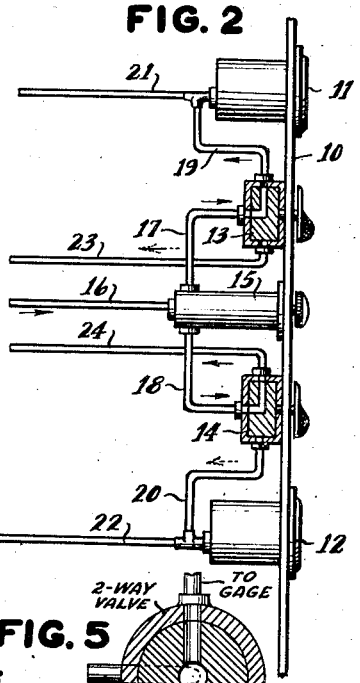
Fig. 2 represents an oil dilution system for use in conjunction with multi-engine installations.
Figure 4:
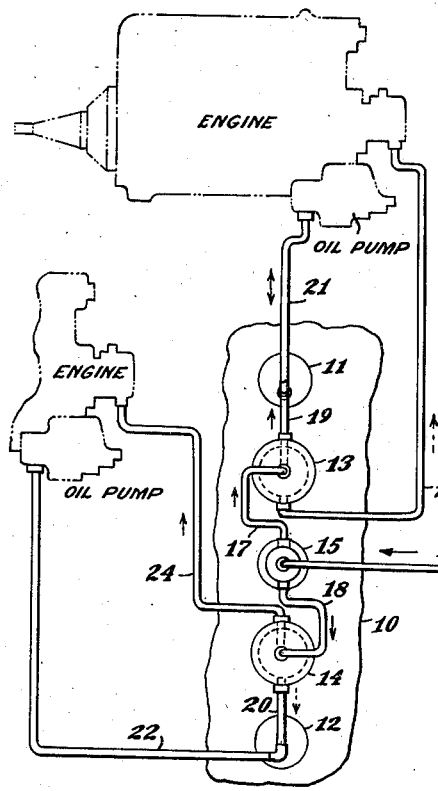
Fig. 4 is a view of the system shown in Fig. 2 and oriented 90° therefrom.

Figs. 2 and 4 show an instrument panel 10 for a multi-engine installation and having oil pressure gauges 11 and 12 mounted thereon for indicating oil pressure in the oil systems of individual engines, conventional two-way rotary valves 13 and 14 are mounted on instrument panel 10 and a priming pump 15 is also mounted on instrument panel 10. A fuel supply line 16 is connected to the inlet side of the pump and pump outlet lines 17 and 18 are connected to the inlet ports of valves 13 and 14, respectively. Valve outlet lines 19 and 20 from each of valves 13 and 14, respectively, communicate with pressure gauge oil lines 21 and 22, respectively, and are connected thereto at the rear of the pressure gauges. Valve outlet lines 23 and 24 lead to the cylinders of individual engines from valves 13 and 14, respectively.

In the system just described, a single priming pump 15 may be utilized for priming a plurality of engines, either individually or simultaneously, determinable by operation of valves 13 and 14, as clearly understandable from the drawing. Likewise, by operation of valves 13 and 14 the oil in lines 21 and 22 may be diluted individually or simultaneously and it will be apparent that in the manner just described any number of engines may be used in conjunction with a single priming pump for the purpose of engine priming and oil line dilution by providing a two-way valve connected in each engine system as taught in Fig. 2, it being necessary only that means be provided for connecting the outlet side of the priming pump to the inlet port of each two-way valve.

My invention has extended application and is not limited to the specific manner of application disclosed. For example, the oil in lines other than those running to pressure gauges may be diluted at the will of the operator by an adaptation of my invention without departing from the spirit thereof, and I claim:

1. An oil dilution system for an internal combustion engine using liquid fuel comprising a pump means having a fuel supply inlet and an outlet means, valve means for communication with said pump outlet means and adapted to direct fuel flow therefrom alternatively to the engine or to an oil line whereby said pump is operative to prime said engine or to force fuel to said oil line for the purpose of diluting oil therein.

2. An oil dilution system for internal combustion engines comprising a priming pump connected to a fuel supply source and a valve having an outlet means communicating with the engine and another outlet means communicating with an oil line whereby fuel under pressure may be alternatively directed from said priming pump to said engine or said oil line through said valve.

3. In a system for diluting oil lines in a multi-engine installation of internal combustion engines, a priming pump having inlet means connected to a source of fuel supply and having an outlet means, a two-way valve in conjunction with each of said engines and having inlet means connected to said outlet means of said priming pump and having an outlet means for communication with its respective engine and other outlet means connected to an oil line in the oil system of said engine whereby said priming pump is operative to alternatively force fuel under pressure to said engine or to said oil line for individually or simultaneously priming said engines and diluting the oil in said oil lines.

4. In combination, an internal combustion engine, a priming pump having connection with a source of fuel supply, a two-way valve and means to conduct fuel under pressure from said pump to said valve, an oil pressure gauge line, an oil pressure gauge connected thereto, means to conduct fuel from said valve to said oil pressure gauge line at the immediate rear of said gauge, means to conduct fuel from said valve to said engine, said pump and said valve being mounted on an instrument panel and operable to alternatively direct fuel to said engine or to said oil pressure gauge line.

NASSER D. OWEN.